A. ROESCH.
CONTROLLER FOR HUMIDITY.
APPLICATION FILED AUG. 28, 1920.
1,430,853.
Patented Oct. 3, 1922.
2 SHEETS—SHEET 2.
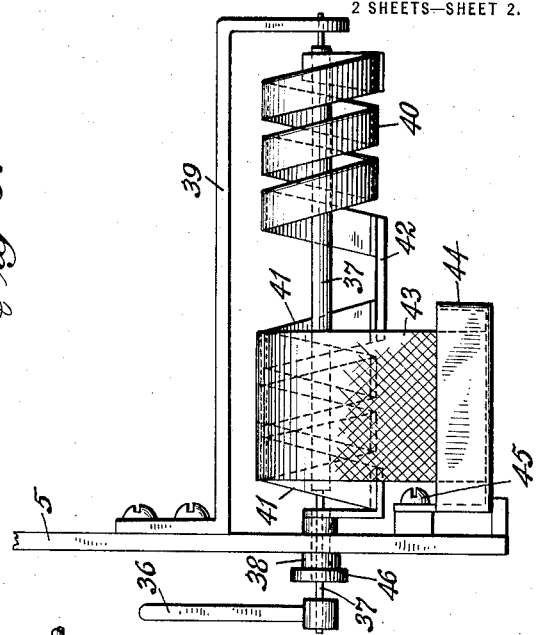
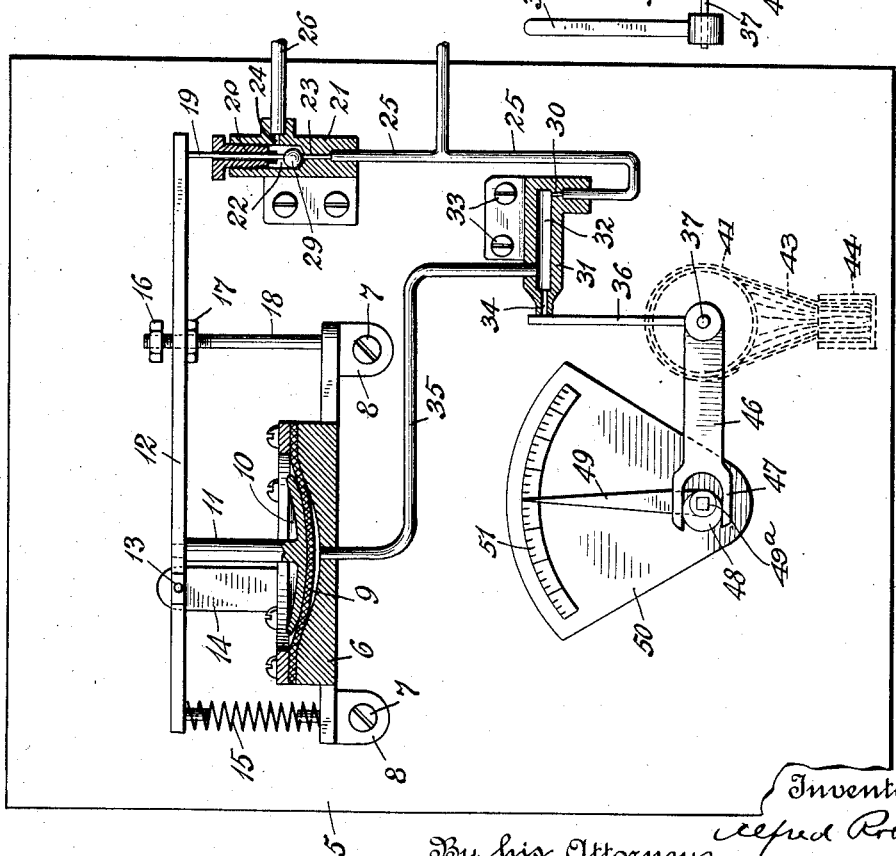

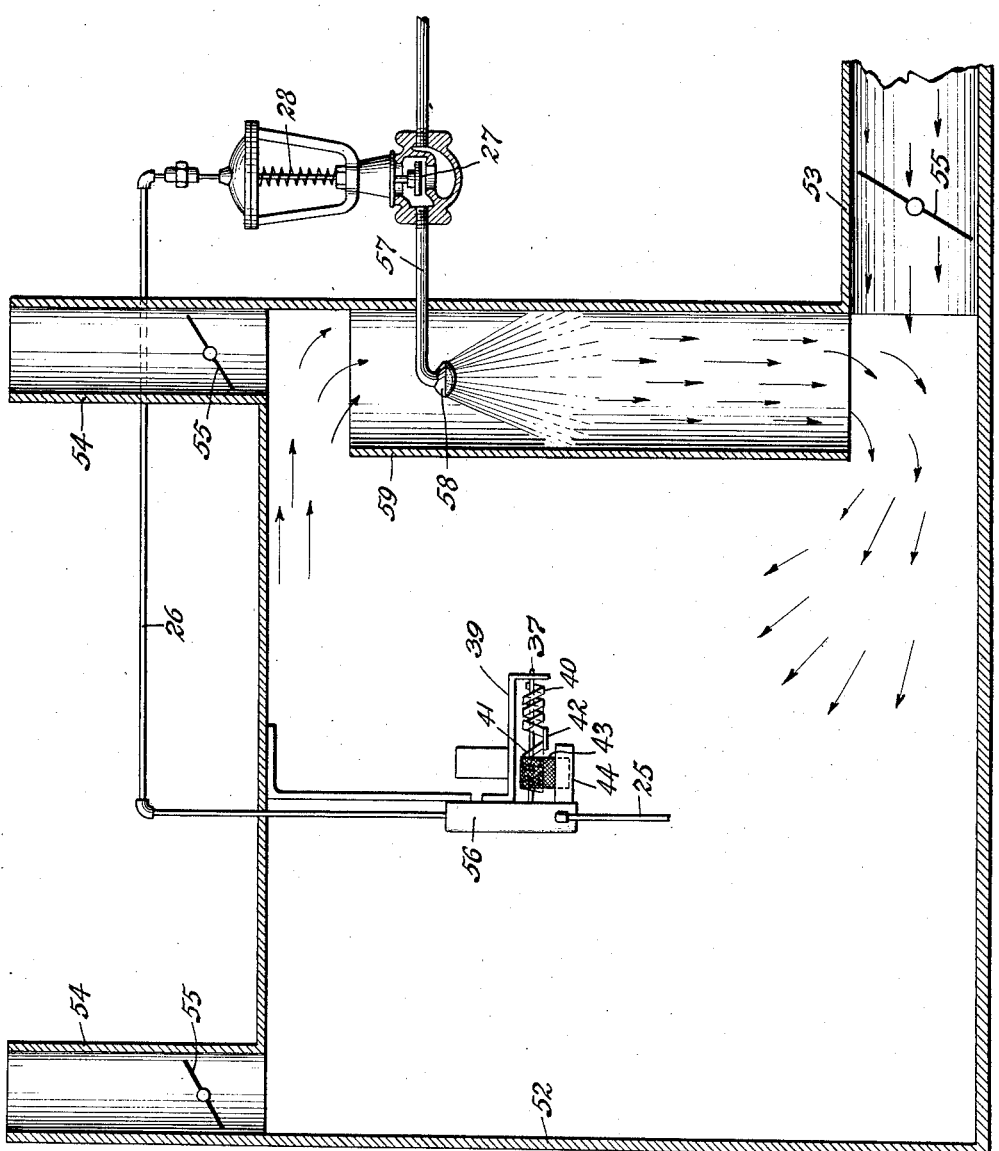

Patented Oct. 3, 1922.

1,430,853

UNITED STATES PATENT OFFICE.

ALFRED ROESCH, OF BROOKLYN, NEW YORK, ASSIGNOR TO CHARLES J. TAGLIABUE MANUFACTURING CO., OF NEW YORK, N. Y., A CORPORATION OF NEW YORK.

CONTROLLER FOR HUMIDITY.

Application filed August 28, 1920. Serial No. 406,739.

*To all whom it may concern:*

Be it known that I, ALFRED ROESCH, a citizen of the United States, and resident of the borough of Brooklyn, county of Kings, city and State of New York, have invented certain new and useful Improvements in Controllers for Humidity, of which the following is a specification.

My invention relates to controllers whereby the percentage of humidity in the air of a room or the like is controlled and has for its object to provide an extremely sensitive device of simple construction for automatically controlling the differences between the dry and wet bulb temperatures so as to automatically maintain a predetermined percentage of humidity in the atmosphere of a room or the like and more particularly where large variations of temperature occur. The predetermined percentage of humidity referred to may be either approximately constant or of progressive increase or decrease. My invention will be fully described hereinafter and the features of novelty will be pointed out in the appended claims.

In the accompanying drawings, which for illustrative and descriptive purposes, show an example of the invention, without defining its limits, Figure 1 represents an installation of the device; Fig. 2 is an elevation of the controller and Fig. 3 is an enlarged detail of a portion thereof.

As shown in the drawings, 5 is a base or support of any suitable dimensions and material upon which the diaphragm motor 6 of any well known type is secured by means of screws or the like 7 which pass through lugs 8 or equivalent members into said base 5. The diaphragm 9 of the motor 6 engages the disk 10 of a rod 11 which is connected with a lever 12 pivoted at 13 upon members 14 forming part of, or secured to the motor 6 as shown in Fig. 2. A suitable spring 15 is located between and in engagement with one end of said lever 12 and a stationary part of the diaphragm motor 6, and serves to actuate said lever under certain conditions as will more fully appear hereinafter. Adjustable stops 16 and 17 may be located upon a stationary upright 18 to limit the swinging movements of the lever 12 if desired. The other end of the lever 12 projects over a stem 19 which is movable lengthwise of and loosely fits an exhaust passage 20 of the valve casing 21 also secured upon said base 5 in any convenient manner. The exhaust passage 20 is in communication with the atmosphere and with a chamber 22 in the casing 21, said chamber 22 being also in communication with channels 23 and 24 which are connected respectively by means of pipes 25 and 26 with a source of air or other fluid under pressure and with a diaphragm motor valve 27 constructed and arranged to close when pressure is applied to its diaphragm and to open under the action of a spring 28 when pressure upon said diaphragm is relieved. The inner end of the stem 19 engages a ball valve 29 located in the chamber 22 and arranged to alternately control the exhaust passage 20 and the air channel 23, the latter being preferably formed with a valve seat for the accommodation of said valve.

The pipe 25 is connected also with a passage 30 of restricted cross-section which is formed in a casing 31 and communicates with a chamber 32 therein, said casing being also fastened upon the base 5 in any suitable way, as by means of screws 33. The chamber 32 is provided with an outlet passage 34 of larger cross-sectional area than the passage 30 and arranged to communicate with the atmosphere, said chamber 32 being further connected, by means of a pipe 35 with the diaphragm motor 6 as shown in Fig. 2. The exit end of the outlet passage 34 is controlled by a valve which in the illustrated example takes the form of a lever 36 which is secured upon a spindle 37 journalled in a bushing 38 on the base 5 and in a bracket 39 fastened thereon at the rear, it being understood that the spindle 37 projects through said base toward the front and that the valve lever 36 is located upon the projecting end thereof as shown in Fig. 3. The bushing 38 is so connected with the base 5 as to be frictionally fixed against unintentional rotation but so as to be capable of being rotatably adjusted, as will appear more fully hereinafter.

The controller in its illustrated form, includes temperature sensitive members in the form of flat, hollow coils or helical springs 40 and 41 which in the illustrated example are duplicates of each other, filled with a suitable fluid in the customary manner and sealed at both ends; these springs 40 and 41 which are of the type commonly known as Bourdon tubes or springs, are arranged to function in opposite directions surround the spindle 37 and have their inner, contiguous ends connected by means of a bar or the like 42, the outer end of the spring 40 being secured to the spindle 37 while the outer end of the spring 41 is fixed against unintentional rotation by being connected with the bushing 38 as shown in Fig. 3. The spring 40 constitutes the dry bulb and the spring 41 the wet bulb, the latter being accordingly covered with a wick 43 which depends into the water contained in the reservoir 44 fastened to the rear face of the base 5, for instance by screws 45.

An arm 46 is attached to or forms an integral part of the bushing 38 and has its free end formed with a fork 47 which projects over an eccentric 48 rotatably mounted upon the base 5; a pointer or indicator 49 is operatively connected with the eccentric 48, for instance by being mounted upon the spindle and is movable across the face of a dial plate 50 located upon said base and having a suitable scale 51 produced thereon. Any suitable means may be provided for adjusting the pointer 49 relatively to the scale 51; for instance, as shown, the spindle of the eccentric 48 whereby said pointer 49 is carried may be provided with a squared end 49ᵃ for the accommodation of a key or other suitable instrument.

In the example chosen for illustrative purposes and shown in Fig. 1, 52 represents a room in which the temperature throughout a given period of time may vary, for instance, from 60° F. to 110° F., especially in the summer time and in which it is important that the percentage of humidity in the air, remain constant regardless of any changes in the dry bulb temperature. The room 52 is provided with an air duct 53 and with ventilating ducts 54 in all of which dampers or equivalent devices 55 are located for manually regulating the ventilation.

The controller, which in the present instance is of the type generally known as a self-contained instrument and which may include a suitable cover 56 whereby the mechanism is covered, may be placed in any convenient position within the room 52, preferably so as to locate the springs 40 and 41 at a point where the average temperature prevails. The diaphragm motor valve 27 controls a water supply pipe 57 which terminates, within the room 52, in a spray nozzle 58 preferably located within an open ended tube 59 as shown. The spray issuing from the nozzle 58 humidifies the air surrounding it and causes a downward movement of said air, whereby a circulation is created in the room 52, by way of the air duct 53 and the ventilating ducts 54 which may be manually regulated by means of the dampers 55.

By way of example let it be assumed that, the dry bulb temperature may vary from 60° to 110° F. during a given period of time and that 48% of humidity is desired to be maintained in the room 52 throughout said period. According to the psychrometric tables issued by the Bureau of Standards, a dry bulb or air temperature of 60° F. and a ten degrees depression of the wet bulb equals 48% of humidity, while with a dry bulb or air temperature of 110° F. a nineteen degrees depression of the wet bulb equals 48% of humidity. In order to maintain approximately 48% of humidity at all stages throughout the given period of time during which the dry bulb temperature changes from 60° to 110° F. it is therefore necessary to provide for a gradual increase in the difference between the dry and wet bulb temperatures. If this is not done and the difference between said dry and wet bulb temperatures is permitted to remain substantially constant at ten degrees, the humidity will reach 70% at a dry bulb temperature of 110° F. according to said psychrometric tables.

In the illustrated example the desired result, that is, the maintenance of the humidity at approximately 48%, is secured as follows: The controller is adjusted for a dry bulb temperature of 60° and a wet bulb temperature of 50° by properly setting the pointer 49 with respect to the scale 51; this may be done, in the illustrated example, by means of a suitable key or other instrument detachably fitted upon the squared end 49ᵃ of the spindle whereby the pointer 49 is carried. The actuation of the pointer will coincidentally operate the eccentric 48, which will communicate its motion to the arm 46 to set the lever valve 36 with respect to the outlet passage 34. This setting of said lever valve 36 also changes the position of the springs 40 and 41 (which partake of the rotation of the spindle 37) in harmony with said adjustment; the latter is such that the air pressure beneath the diaphragm 9 of the motor 6 maintains the same and with it the lever 12 in a raised position so that while the end of the lever 12 is in contact with the valve stem 19, it exerts practically no pressure thereon. The ball valve 29 is therefore maintained in a position, by the air pressure, to close the exhaust passage 20 and thus permits the air pressure to reach the diaphragm valve 27, which is therefore in its closed position. With this adjustment the 48% of humidity is provided with the dry bulb temperature at 60° F. and the wet bulb temperature at 50° F.

If now the dry bulb temperature rises, the fluid in the spring 40, which latter constitutes the dry bulb, becomes heated and expands and thus causes said dry bulb to uncoil or open thereby rotating the spindle 37 to the left in Fig. 2 and as a result moving the lever valve 36 away from the end of the outlet passage 34. The air pressure beneath the diaphragm 9 of the motor 6 being thereby relieved, the lever 12 will be swung on its pivot by the action of the spring 15 and will thus depress the stem 19 and force the ball valve 29 away from the exhaust passage 20 and toward the air channel 23. The pressure upon the diaphragm of the diaphragm motor valve 27 being thus relieved, by way of the exhaust passage 20, the spring 28 will open said valve 27 and cause a spray to issue from the spray nozzle 58 whereby the air in the room becomes humidified. As this humidification of the air proceeds the spring 41, which constitutes the wet bulb, becomes heated and because of the consequent expansion of the fluid therein, is uncoiled and rotates the spindle 37 to the right in Fig. 2 or in a direction opposite to that caused by the action of the dry bulb 40; the latter serves to transmit the described movement of the coil 41 to the spindle 37 because of the connecting bar 42. As said spindle 37 is thus moved to the right the lever valve 36 is moved against the end of the outlet passage 34 and closes the same to the atmosphere. The air pressure will now accummulate beneath the diaphragm 9 of the motor 6 and will actuate said diaphragm outwardly whereby the lever 12 is pivotally swung against the tension of the spring 15 and away from the valve stem 19. The ball valve 29 being thereby released is forced, by the air pressure, against the end of the exhaust passage 20 to close the same and permits said air pressure to reach the diaphragm of the valve 27 and to thus close the latter whereby the spray issuing from the spray nozzle 58 is cut off.

This alternate opening and closing of the outlet passage 34 and the resulting actuation of the valve 27 through the successive operations of the dry bulb 40 and wet bulb 41 whereby the spray is periodically turned on and off is repeated throughout the given period of time during which the percentage of humidity in the air is to be maintained. In this manner the differences between the dry and wet bulb temperatures will be gradually increased until it is 19° F. at a dry bulb temperature of 110° F. The humidity of 48% is thus maintained, within a very slight variation, throughout the rise from 60° to 110° F.; it will be understood that the apparatus may be set for other combinations with equal facility and that the same efficient results will in each case be automatically obtained.

When a gradual increase or decrease in the percentage of humidity in the air is desired one spring, that is 40 or 41, is made shorter or longer than the other, thereby varying the movement between the springs so that when the dry bulb temperature increases or decreases the differences in temperature between the dry and wet bulbs will change accordingly. To give the desired increase or decrease in humidity a lamina may be utilized as well.

My invention is simple in construction and efficient in operation and once set, requires no attention as its operaton is entirely automatic and in accordance with predetermined desires.

Various changes in the specific form shown and described may be made within the scope of the claims without departing from the spirit of my invention.

I claim:

1. A controller of the kind described, comprising an air valve, a lever whereby said air valve is controlled, a diaphragm motor actuated by fluid pressure, whereby said lever is operated to actuate said valve, a lever valve controlling the operation of said diaphragm motor, a spindle carrying said lever valve, oppositely acting temperature, sensitive springs constituting dry and wet bulbs respectively whereby said spindle is rocked in opposite directions to operate said lever valve, an arm connected with one of said springs, an eccentric operatively connected with said arm and an indicator for actuating said eccentric and arm to vary the adjustment of said lever valve.

2. A controller of the kind described, comprising an air valve, a lever whereby said air valve is controlled, a diaphragm motor actuated by fluid pressure, whereby said lever is operated to actuate said valve, a lever valve controlling the operation of said diaphragm motor, a spindle carrying said lever valve, oppositely acting temperature sensitive springs constituting dry and wet bulbs respectively whereby said spindle is rocked in opposite directions to operate said lever valve, and means for varying the adjustment of said lever valve.

3. A controller of the kind described, comprising an air valve, a lever whereby said air valve is controlled, a diaphragm motor actuated by fluid pressure and having its diaphragm operatively connected with said lever whereby the latter is operated to actuate said valve, a lever valve controlling the operation of said diaphragm motor, a spindle carrying said lever valve and temperature sensitive means acting as dry and wet bulbs whereby said spindle is rocked in opposite directions to operate said lever valve.

4. The combination of air-humidifying means, a diaphragm motor valve controlling the same, an air valve whereby air under pressure is admitted to and cut off from said diaphragm motor valve, a pivoted lever whereby said air valve is controlled, a diaphragm motor connected directly with said lever, a controlling valve whereby the operation of said diaphragm motor valve is controlled and oppositely acting temperature sensitive springs constituting dry and wet bulbs whereby said controlling valve is actuated in accordance with the differences between the dry and wet bulb temperatures.

In testimony whereof I hereunto set my hand.

ALFRED ROESCH.